United States Patent [19]

Storey

[11] Patent Number: 4,736,115

[45] Date of Patent: Apr. 5, 1988

[54] CONTROL CIRCUIT WITH PLURAL INDIVIDUAL SELECTABLE CONTROLS

[75] Inventor: Phillip J. Storey, Coogee, Australia

[73] Assignee: Greater Union Theatre Supplies Pty. Limited, Australia

[21] Appl. No.: 787,828

[22] PCT Filed: Feb. 11, 1985

[86] PCT No.: PCT/AU85/00023

§ 371 Date: Oct. 8, 1985

§ 102(e) Date: Oct. 8, 1985

[87] PCT Pub. No.: WO85/03582

PCT Pub. Date: Aug. 15, 1985

[30] Foreign Application Priority Data

Feb. 9, 1984 [AU] Australia .................. PG3543

[51] Int. Cl.⁴ .................. G05B 24/02; H04Q 9/14
[52] U.S. Cl. ........................ 307/38; 307/242
[58] Field of Search .......... 307/38, 30, 142, 242; 340/825.03, 825.5; 361/190, 194; 369/2

[56] References Cited

U.S. PATENT DOCUMENTS

| | | |
|---|---|---|
| 3,239,689 | 3/1966 | Winder .................. 340/825.03 |
| 3,258,613 | 6/1966 | Felcheck et al. .................. 307/38 |
| 3,266,017 | 8/1966 | Danielsen .................. 340/825.03 |
| 3,296,499 | 1/1967 | Quinlan .................. 361/193 |
| 3,368,200 | 2/1968 | McNicol .................. 369/2 X |
| 3,461,444 | 8/1969 | Eisele .................. 361/194 X |
| 3,761,945 | 9/1973 | Engle .................. 340/825.03 |
| 4,027,208 | 5/1977 | Look .................. 361/194 |
| 4,028,620 | 6/1977 | Kitagawa et al. .................. 307/38 X |
| 4,177,388 | 12/1979 | Lingenfelter .................. 307/38 |
| 4,318,006 | 3/1982 | Himeno et al. .................. 307/142 |
| 4,348,616 | 9/1982 | Tanaka et al. .................. 307/38 X |
| 4,430,576 | 2/1984 | Fowler .................. 307/38 |
| 4,594,515 | 6/1986 | Hummel .................. 307/38 X |

FOREIGN PATENT DOCUMENTS

8103713 12/1981 PCT Int'l Appl. .................. 369/2

*Primary Examiner*—Bentsu Ro
*Attorney, Agent, or Firm*—Townsend & Townsend

[57] ABSTRACT

An electrical circuit for the control of a parameter of sound, lighting, etc. within an auditorium by a selected one of a plurality of interconnected controlling devices, wherein each of the devices comprises a manual control (R4) for said parameter which is effective upon operation of a latched trigger (G3, G4), the trigger being activated whenever a signal is received from a selection circuit (STROBE) common to all of the devices while a manual switch (SW1) at a selected device is operated, and the trigger becoming unlatched when a subsequent signal is received and the manual switch is not operated.

7 Claims, 1 Drawing Sheet

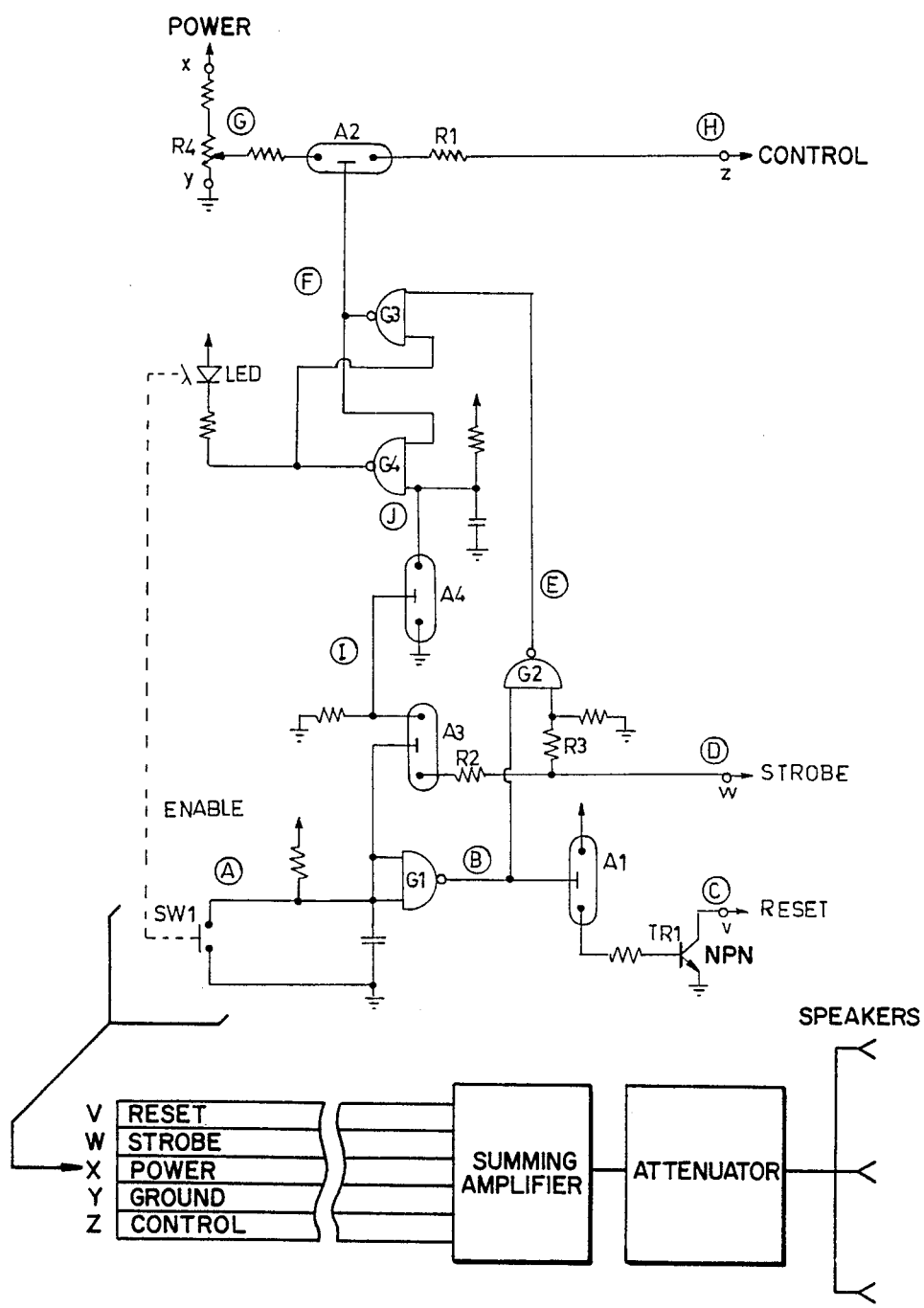

CONTROL CIRCUIT WITH PLURAL INDIVIDUAL SELECTABLE CONTROLS

This invention relates to electrical control circuits of the kind providing for operator control at any one of plural remote positions after registration of selection by the operator of a controlling device at that position.

BACKGROUND ART

Control circuits of this kind, although having many other applications, are commonly employed in motion picture theatres and other auditoriums equipped with public address systems or other forms of amplified sound equipment. By their use a person, or persons, at different parts of the theatre may determine the optimum volume of sound for the comfort of patrons. This has been achieved by locating a multiplicity of controlling devices at individual positions throughout the theatre and providing for control of the sound amplitude at any instant only at a single device which has been selected by the operator and identified. Hitherto, equipment of this nature has employed electro-mechanical components and has been expensive, cumbersome and not sufficiently flexible in use.

DISCLOSURE OF INVENTION

It is the main object of the invention to provide a control circuit of the above kind which is relatively inexpensive and compact.

To this end the invention in one general form consists of a control circuit for an electrical function and comprising a plurality of controlling devices connectable to a control bus of the circuit for said electrical function, and including a selection control circuit common to all of said controlling devices, each one of said controlling devices having a manual control for said function connectable via a semi-conductor switching device to said control bus, a switch manually operable for effecting by means of a signal from said selection control circuit activation of said switching device of a selected one of said controlling devices, and a trigger device effecting activation of said switching device when said trigger device is latched by operation of said manual switch and simultaneous receipt of said signal and becoming unlatched upon receipt of a subsequent one of said signals at a time when said manual switch is not operated.

BRIEF DESCRIPTION OF DRAWINGS

The invention will be more readily understood from the following description of a preferred embodiment read in conjunction with the accompanying drawing (sole FIGURE) of a schematic diagram of a controlling device constructed according to this invention.

BEST MODE OF CARRYING OUT THE INVENTION

It will be assumed that the controlling device shown in the drawing is one of a plurality of such devices disposed at convenient positions thoughout a motion picture theatre about which is installed a control bus of a ribbon cable of conventional form connected with control apparatus which is common to all of the controlling devices. This apparatus will have an ground bus, a power bus and a control bus of the ribbon cable connected with a summing amplifier to operate D.C. controlled electronic attenuators for sound being broadcast within the theatre. Each controlling device, as shown in the drawing, is preferably provided in a compact portable casing and utilizes a conventional insulation displacement connector to permit the device to be electrically connected to the ribbon cable at any convenient position within the theatre, either upon installation of the control circuit, or even at the will of an operator.

Each one of the controlling devices, as shown by the drawing, is terminated at points v, w, x, y and z on its connector and these terminals in turn will derive from the ribbon cable, respectively, RESET, STROBE, power, ground and CONTROL. It will also be noted that the entire logic of this circuit is derived from a single quad analogue gate 4016 and a single dual input quad NAND gate 4011. Both are inexpensive, semi-conductor chips.

Switch SW1 is manually operable by the operator for selection of the respective controlling device. The switch SW1 is preferably a press-button housing the LED which becomes illuminated upon selection of the device in order to identify the controlling device where control of the sound amplitude can be effected. When SW1 is closed a "0" occurs at position (A) which is applied through the NAND gate G1 and appears as a "1" at point (B) which, being applied to the control gate of the analogue gate A1, induces base current flow in the transistor TR1 which then places the point (C) at ground potential so that a "0" is placed on the RESET bus of the ribbon cable. Preferably a parity check circuit is connected to the RESET bus to safeguard against false operation resulting from interference by extraneous signals. A parity circuit ideal for this purpose is described in U.S. patent application No. 787,827, now abandoned. As a result a "1" appears at the point (D) via the STROBE bus connected to terminal w. As a "1" now appears at both points (B) and (D), and therefore both inputs to the NAND gate G2, a "0" appears at point (E) to produce a "1" at point (F) which is latched on through the action of the flip-flop G3, G4. Analogue gate A2 thus permits transmission of an analogue control voltage determined at point (G) and under the control of the manually operable rheostat R4 to be applied via terminal z to the CONTROL bus. Hence, it will be seen that operation of switch SW1 has caused illumination of the LED and permitted transmission of a d.c. control voltage to a common summing amplifier and thence to DC controlled electronic attenuators for amplitude control. The purpose of resistors R1, R2 and R3, as well as transistor TR1, is for isolation purposes to protect the rather delicate semi-conductor devices against RF energy appearing an any bus.

If now, control is desired from a different controlling device, and its switch SW1 has been depressed, a "1" will appear on the common STROBE bus, and as switch SW1 is open and a "1" is applied to the control gate of analogue gate A3, a signal is passed via analogue gate A4 to reset the flip-flop G3, G4, thereby unlatching the trigger on gate A2. Control of sound amplitude may then be effected independently from the newly selected controlling device. It will be seen that under these circumstances where a "1" occurs at point (D) a "1" remains at point (E) as the input to gate G2 which is connected to point (B) is presented with a "0".

Whereas a single embodiment has been described in the foregoing passages, it should be understood that other forms, modifications and refinements are feasible within the scope of this invention.

What is claimed is:

1. A system for electrical control of a function within a defined area, comprising:

an electrical bus traversing at least part of said area;

a control circuit connected with said electrical bus and operable to provide electrical control of said function;

a plurality of controlling devices connectable to said electrical bus for individual operation of said control circuit;

each one of said controlling devices having a semi-conductor device, a manual control means for deriving a voltage to operate said control circuit and being connectable to said control bus with activation of said semi-conductor device, an electronic latch, a switch manually operable for effecting, by means of a first signal provided from said control circuit, closure of said latch for activation of said semi-conductor device; and means for opening of said latch upon receipt of a second signal provided from said control circuit at the time when said manually operable switch is not operated.

2. A control system as claimed in claim 1, with said electronic latch being a flip-flop, and said opening means for said latch being a reset circuit for said flip-flop including a normally closed switch opening with operation of said manually operable switch.

3. A control system as claimed in claim 2, with said reset circuit being one element of a single quad analog gate IC and another element thereof comprising said semi-conductor device.

4. A control system as claimed in claim 3, with said electrical bus including a ribbon cable provided with five conductors.

5. A control system as claimed in claim 1, with said electrical bus including a ribbon cable provided with five conductors.

6. A control system as claimed in claim 2, with said electrical bus including a ribbon cable provided with five conductors.

7. A control system as claimed in claim 2, with all of the active electronic components of each of said controlling devices being provided by a single quad analog gate IC and a single dual input quad NAND gate IC.

* * * * *